United States Patent Office 3,534,050
Patented Oct. 13, 1970

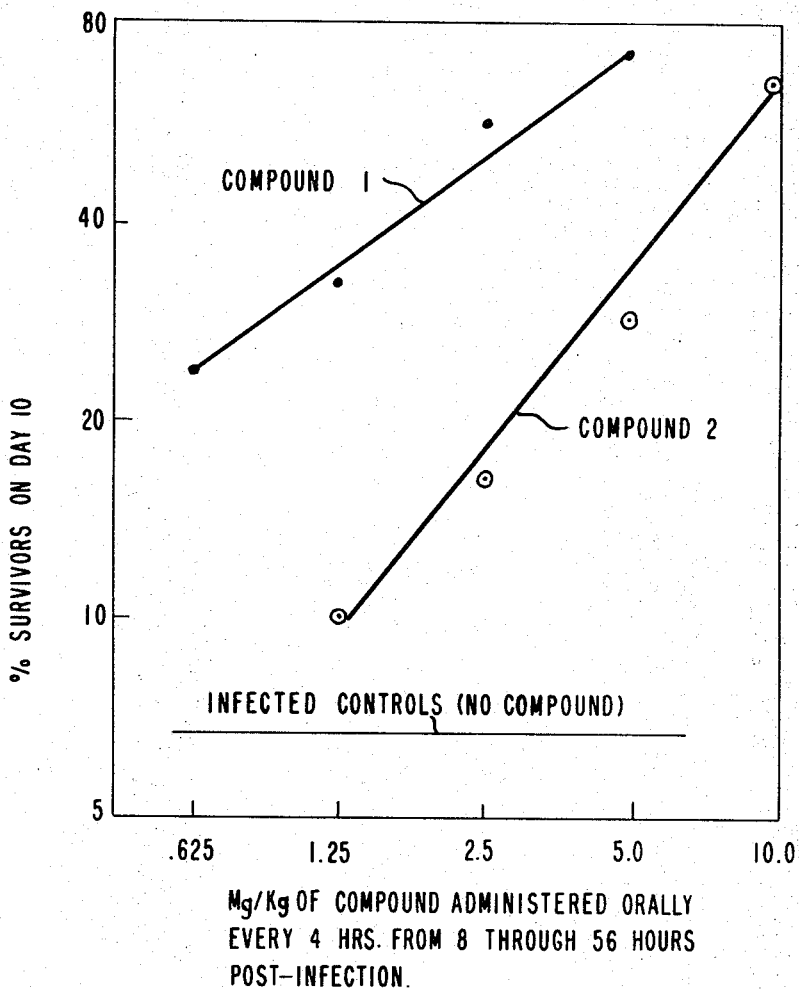

3,534,050
4-OXAZOLIDONES HAVING CYCLIC FLUORO-
ALKYLENE SUBSTITUENTS IN THE 2- AND
5-POSITIONS
William J. Middleton, Wilmington, Del., assignor to E. I.
du Pont de Nemours and Company, Wilmington, Del.,
a corporation of Delaware
Continuation-in-part of application Ser. No. 636,019,
May 4, 1967, which is a continuation-in-part of application Ser. No. 555,974, June 8, 1966, which in turn
is a continuation-in-part of application Ser. No. 435,734,
Feb. 26, 1965. This application June 28, 1968, Ser.
No. 741,054
Int. Cl. C07d 85/48
U.S. Cl. 260—294   5 Claims

ABSTRACT OF THE DISCLOSURE

Described are 4-oxazolidones having perfluorotrimethylene substituents in the 2- and 5-positions forming a spiro cyclic structure with the respective oxazolidone ring carbons. Unlike the related compounds with nonjoined (acyclic) substituents in the 2- and 5-positions, these compounds are useful as therapeutic and prophylactic agents against influenza-B virus to warm-blooded animals such as mice and ferrets as well as primates, e.g., monkeys and chimpanzees.

RELATED APPLICATIONS

This application is a continuation-in-part of my copending application, Ser. No. 636,019, filed May 4, 1967, which is a continuation-in-part of my application, Ser. No. 555,974, filed June 8, 1966, and now abandoned, which was a continuation-in-part of my copending application Ser. No. 435,734, filed Feb. 26, 1965, and issued Mar. 21, 1967, as U.S. Pat. 3,310,570.

BACKGROUND OF THE INVENTION

Field of the invention

This application relates to, and has as its principal object provision of, 4-oxazolidones having perfluoroalkylene substituents in the 2- and 5-positions forming cyclic structures spiro with the oxazolidone ring useful to warm-blood animals against influenza-B virus.

Description of the prior art

My U.S. Pat. 3,310,570 of Mar. 21, 1967, entitled "trifluoromethyl-substituted 4-oxazolidones and their preparation," discloses and claims 4-oxazolidones having trifluoromethyl substituents in the 2- and 5-positions. Unlike the compounds of this invention, the patented trifluoromethyl-substituted compounds are ineffective against influenza virus.

SUMMARY AND DESCRIPTION
OF THE INVENTION

The 4-oxazolidones of the present invention may be represented by the formula

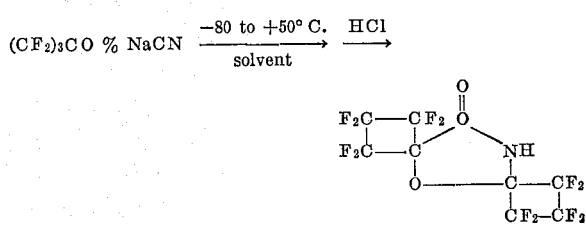

I.

in which X may be H, CH₃, or a cation of low toxicity such as NH₄, substituted ammonium containing up to three alkyl, cycloalkyl, hydroxyalkyl groups, or one alkylene group of 1–5 carbon atoms, the total number of carbon atoms being not more than 12, and metal ions of atomic number 20 or less, exclusive of beryllium, i.e., Li, Na, Mg, Al, K and Ca.

It will be understood that in the case of the salts, the substituent X is not, strictly speaking, formally attached to N, but may be more or less dissociated, and when dissociated the residual electron charge on the heterocycle ring may be distributed over the —O—C—N— atoms as shown:

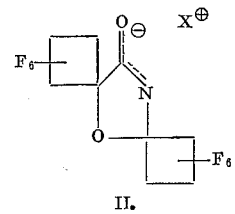

II.

Moreover, when the valence of the cation is greater than 1, there will be a corresponding or equivalent number of 4-oxazolidone "ions" present.

The compounds of this invention are prepared by contacting at least two equivalents of perfluorocyclobutanone (see U.S. Pat. 3,039,995) with one equivalent of an ionic cyanide in a polar solvent at a temperature from —80° to +50° C., preferably, —50° to +20° C., to form the salt of the lactam. When the lactam salt is protonated with aqueous acid (dilute HCl or H₂SO₄), the resulting lactam precipitates. The lactam can be purified by conventional means such as recrystallization or sublimation. An exemplary partial equation for these reactions can be written as:

$$(CF_2)_3CO \,\%\, NaCN \xrightarrow[\text{solvent}]{-80 \text{ to } +50^\circ C.} HCl \longrightarrow$$

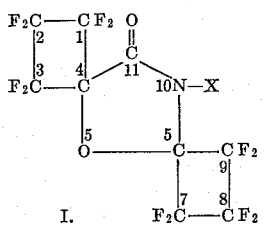

Salts of the lactam can be prepared from the free lactam (which is acidic) by neutralization with the appropriate bases.

Cyanides that can be used in the reaction above are basic cyanides such as sodium cyanide, cesium cyanide, potassium cyanide, lithium cyanide, quaternary ammonium cyanides such as tetramethylammonium cyanide and tetraethylammonium cyanide, or hydrogen cyanide plus a small amount of one of the previously named cyanides. Cyanides having large cations, e.g., tetramethyl- and tetraethylammonium cyanides, are preferred.

Suitable polar solvents for the reaction above include acetonitrile, 1,5-dimethoxy-3-oxapentane (diglyme), tetrahydrofuran, dimethylsulfoxide, and dimethylformamide.

The salt of the lactam can be treated with methylating agents such as CH₃I or (CH₃)₂SO₄ to give N-methyl-lactam, a compound of the invention, which can be purified by distillation. The N-methyllactam can also be prepared by reaction of an ethereal solution of diazomethane with the free lactam at room temperature to about 50° C.

The compounds of this invention are useful to warm-blooded animals against influenza-B virus as shown in the drawing. This effect is quite surprising, inasmuch as the closely related compounds of my U.S. Pat. 3,310,570, show no such activity.

EMBODIMENTS OF THE INVENTION

There follow some nonlimiting examples illustrative of the compounds of this invention falling within generic Formula I above. Percentages in these examples are by weight.

EXAMPLE 1

1,1,2,2,3,3,7,7,8,8,9,9-dodecafluoro-10-aza-5-oxadispiro-[3.1.3.2]undecan-11-one (X=H)

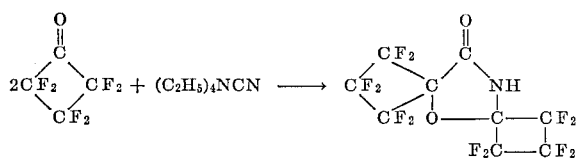

A solution of 15.0 g. (0.09 mole) of tetraethyl-ammonium cyanide in 160 ml. of acetonitrile was filtered under nitrogen, and the filtrate was cooled to −30° C. Perfluorocyclobutanone, 22 ml. at −10° C. (about 0.2 mole), was distilled over a period of 1 hour into the stirred filtrate, the temperature being kept at about −30° C. The reaction mixture was allowed to warm slowly to 25° C., and stirred at this temperature for 16 hours. The reaction mixture was acidified by addition of 100 ml. of 10% hydrochloric acid, and the oil that separated was washed with water until it solidified. The solid was collected on a filter, recrystallized from benzene, sublimed at 100° C. (5 mm.), and recrystallized again from benzene. There was obtained 16.8 g. (46%) of 1,1,2,2,3,3,7,7,8,8,9,9 - dodecafluoro-10-aza-5-oxa-dispiro[3.1.3.2]undecan-11-one as colorless needles, M.P. 118–119° C.

*Analysis.*—Calcd. for $C_9HF_{12}NO_2$: C, 28.22; H, 0.26; F, 59.53; N, 3.66; N.Eq., 383. Found: C, 28.42; H, 0.39; F, 59.41; N, 3.67; N.Eq., 395. pKa (40% ethanol), 3.53, 3.56.

EXAMPLE 2

1,1,2,2,3,3,7,7,8,8,9,9-dodecafluoro-10-methyl-10-aza-5-oxadispiro[3.1.3.2]undecan-11-one (X=CH₃)

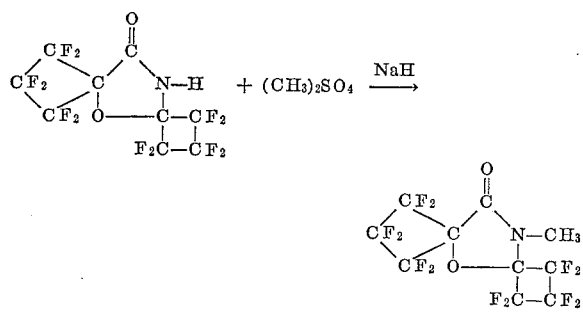

A solution of 14.5 g. (0.038 mole) of 1,1,2,2,3,3,7,7,8,8,9,9 - dodecafluoro - 10 - aza - 5 - oxadispiro[3.1.3.2] undecan-11-one in 50 ml. of ethylene glycol dimethyl ether was added dropwise to a stirred suspension of 1.92 g. (0.04 mole) of 50% sodium hydride (in mineral oil) in 50 ml. of ethylene glycol dimethyl ether cooled to 0° C. The reaction mixture was stirred for 5 minutes after the addition, and then 6.3 g. (0.05 mole) of dimethyl sulfate was added dropwise over a period of 15 minutes. The reaction mixture was warmed to 25° C. and stirred for 16 hours. Hydrochloric acid (100 ml. of 10%) was added, the organic layer was collected in methylene chloride, and the methylene chloride solution was washed with water and dried over magnesium sulfate. This crude product contained 94% of the N-methyl derivative and 6% of the O-methyl derivative as analyzed by gas chromatography. The crude product was distilled, and two fractions were collected. The higher-boiling fraction, B.P. 67.3–67.5° C. (10 mm.), $n_D^{25}$ 1.3550, 5.65 g., was 98% pure 1,1,2,2,3,3,7,7,8,8,9,9 - dodecafluoro - 10 - methyl-10-aza-5-oxa-dispiro[3.1.3.2]undecan-11-one. The lower-boiling fraction, B.P. 54–67.3° C., contained about 90% of the above product and about 10% of 1,1,2,2,3,3,7,7,8,8,9,9-dodecafluoro - 11 - methoxy - 5 - oxa - 10 - aza-dispiro[3.1.3.2] undec-10-ene.

EXAMPLE 3

Piperidine salt of 1,1,2,2,3,3,7,7,8,8,9,9-dodecafluoro-10-aza-5-oxadispiro[3.1.3.2]undecan-11-one (X=piperidinium)

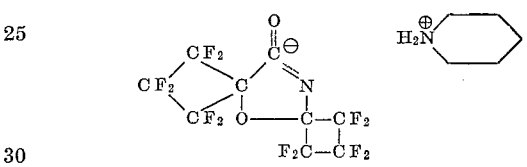

Piperidine, 0.255 g. (3 mmoles) was mixed with 1.15 g. (3 mmoles) of powdered 1,1,2,2,3,3,7,7,8,8,9,9-dodecafluoro - 10 - aza - 5 - oxadispiro[3.1.3.2]undecan-11-one. The mixture became warm. It was further heated until the entire sample melted. The liquid solidified upon cooling to give a white solid, M.P. 113–115° C. The infrared spectrum showed a band at 6.04µ.

EXAMPLE 4

1,1,2,2,3,3,7,7,8,8,9,9-dodecafluoro-10-aza-5-oxadispiro [3.1.3.2]undecan-11-one (A) A mixture of 40 g. of hexafluorocyclobutanone, 3 g. of hydrogen cyanide and a few crystals of potassium cyanide was sealed in a Carius tube at liquid nitrogen temperature. On thawing and shaking, an exothermic reaction occurred. The tube was cooled and opened, and the contents were distilled to give 9.8 g. (21%) of hexafluorocyclobutanone cyanhydrin and 28 g. (66.7%) of a colorless oil, B.P. 76° C. (14 mm.), $n_D^{25}$ 1.3413. This product is derived from three moles of perfluorocyclobutanone and one of cyanide.

*Analysis.*—Calcd. for $C_{13}HF_{18}NO_3$: C, 27.83; H, 0.18; F, 60.96; N, 2.50. Found: C, 28.13; H, 0.26; F, 60.79; N, 2.68.

(B) One perfluorocyclobutanone moiety of the above product is readily removed by treatment with basic reagents. A solution of 22.3 g. of the product of Part A dissolved in 5 ml. of glyme (the dimethyl ether of ethylene glycol) was added slowly to 4 g. of 52% sodium hydride (in mineral oil). The mixture was cooled and added slowly to ice. After acidification with hydrochloric acid, the mixture was extracted with methylene chloride, washed with water, dried, and distilled. There was obtained 8.6 g. of a colorless oil, B.P. 110° C. (3 mm.), that solidified upon cooling. Recrystallization from nitromethane gave 4.1 g. of 1,1,2,2,3,3,7,7,8,8,9,9-dodecafluoro - 10 - aza - 5 - oxadispiro-[3.1.3.2]undecan-11-one, M.P. 118–119° C. Infrared absorption was at 5.62µ (C=O). The H¹nmr spectrum showed a broad peak at 5.70τ.

*Analysis.*—Calcd. for $C_9HF_{12}NO_2$ (percent): C, 28.22; H, 0.26; F, 59.53; N, 3.66. Found (percent): C, 28.40; H, 0.49; F, 59.20; N, 3.63.

EXAMPLE 5

1,1,2,2,3,3,7,7,8,8,9,9-dodecafluoro - 11 - methoxy-5-oxa-10 - azadispiro[3.1.3.2]undec - 10 - ene and 1,1,2,2,3,3,7,7,8,8,9,9 - dodecafluoro - 10 - methyl-5-oxa-10-azadispiro[3.1.3.2]undecan-11-one

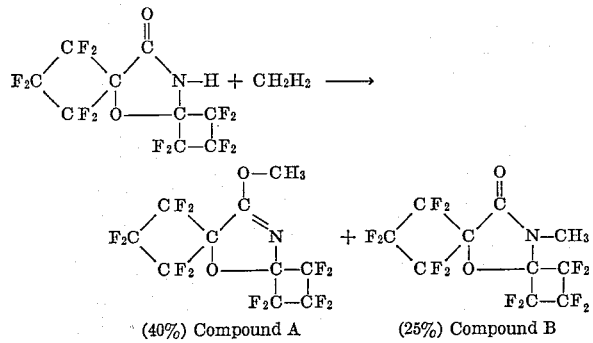

(40%) Compound A    (25%) Compound B

Four grams (0.0104 mole) of 1,1,2,2,3,3,7,7,8,8,9,9-dodecafluoro-5-oxa-10 - azadispiro[3.1.3.2]undec - 11-one in 50 ml. of diethyl ether was cooled in an ice bath and a diethyl ether solution of diazomethane (ca. 0.0002 mole/ml.) added. About 50 ml. of solution was required to obtain a yellow color which persisted. Diethyl ether was removed by evaporation and the residual oil was separated by gas chromatography into 1.6 g. (40%) of 1,1,2,2,3,3,7,7,8,8,9,9-dodecafluoro - 11 - methoxy-5-oxa-10 - azadispiro[3.1.3.2]undec - 10 - ene (Compound A), $n_D^{25}$ 1.3413, and 1.0 g. (25%) of 1,1,2,2,3,3,7,7,8,8,9,9-dodecafluoro - 10 - methyl - 5 - oxa - 10 - azadispiro [3.1.3.2]undecan-11-one (Compound B), $n_D^{25}$ 1.3553. Compounds A and B are both colorless liquids.

Infrared absorption of compound A was at 6.0$\mu$ (C=N) and of compound B was at 5.64$\mu$ (C=O). The H¹nmr spectrum of Compound A showed a single peak at 6.13$\tau$ and that of Compound B showed a single peak at 6.98$\tau$.

*Analysis.*—Calcd. for $C_{10}H_3F_{12}NO_2$ (percent): C, 30.25; H, 0.77; F, 57.43; N, 3.52. Found A (percent): C, 30.63; H, 1.32; F, 57.08; N, 3.53. Found B (percent): C, 30.61; H, 0.94; F, 57.62; N, 3.26.

EXAMPLE 6

A mixture of 21 g. of perfluorocyclobutanone, 2 cc. of hydrogen cyanide and a few crystals of potassium cyanide was put into a Carius tube in a liquid nitrogen bath. A spontaneous, exothermic reaction occurred on warming and mild agitation. The tube was cooled, opened and the contents distilled. Following low-boiling perfluorocyclobutanone cyanohydrin, there was obtained 12.0 g. of a colorless oil. Analysis of a subsequent preparation (Example 4–A) showed this product to be derived from three moles of perfluorocyclobutanone and one of hydrogen cyanide.

A suspension of 1.6 g. of sodium hydride/mineral oil in glyme was stirred while adding 9.5 g. of above oil dropwise. A vigorous reaction occurred. No reaction appeared to occur on subsequent addition of 5 g. of ethyl bromide. The reaction mixture was poured onto ice, acidified with HCl and the product extracted into methylene chloride. The methylene chloride solution was dried and the mixture distilled. After removal of the solvent, the new product solidified in the still. The product was recovered from the still by rinsing with ether and ultimately crystallizing the product from methylene chloride. There was obtained 3.3 g. of 1,1,2,2,3,3,7,7,8,8,9,9-dodecafluoro-10 - aza-5-oxadispiro[3.1.3.2]undecan-11-one, M.P. 118–119° C.

*Analysis.*—Calcd. for $C_9HF_{12}NO_2$ (percent): C, 28.22; H, 0.26; F, 59.53; N, 3.66. Found (percent): C, 28.40; H, 0.49; F, 59.20; N, 3.63.

Other pharmaceutically acceptable oxazolidone salts of this invention may be prepared by neutralization of the isolated lactam with the basic reagent of column A in the following table to give the product listed in column B where the group $C_9F_{12}NO_2^{\ominus}$ is the deprotonated 1,1,2,2,3,3,7,7,8,8,9,9-dodecafluoro-10-aza-5-oxadispiro[3.1.3.2]-undecane-11-one

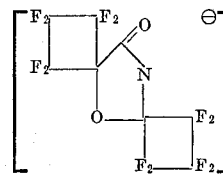

| A | B |
|---|---|
| NaOH | $C_9F_{12}NO_2^{\ominus}Na^{\oplus}$. |
| KOH | $C_9F_{12}NO_2^{\ominus}K^{\oplus}$. |
| Mg(OH)₂ | $[C_9F_{12}NO_2]_2^{-}Mg^{++}$. |
| Ca(OH)₂ | $[C_9F_{12}NO_2]_2^{-}Ca^{++}$. |
| Al(OH)₃ | $[C_9F_{12}NO_2]_3^{-}Al^{+3}$. |
| NH₄OH | $C_9F_{12}NO_2^{\ominus}NH_4^{\oplus}$. |
| (CH₃)₃N | $C_9F_{12}NO_2^{\ominus}(CH_3)_3NH^{\oplus}$. |
| (CH₃)₃CNH₂ | $C_9F_{12}NO_2^{\ominus}(CH_3)_3CNH_3^{\oplus}$. |
| (C₂H₅)₂NH | $C_9F_{12}NO_2^{\ominus}(C_2H_5)_2NH_2^{\oplus}$. |
| (HOC₂H₄)₂NH | $C_9F_{12}NO_2^{\ominus}(HOC_2H_4)NH_2^{\oplus}$. |
| (HOC₂H₄)(CH₃)₂N | $C_9F_{12}NO_2(HOC_2H_4)(CH_3)_2NH^{\oplus}$. |
| H(CHOH)₅CH₂NHCH₃ (methylglucamine) | $C_9F_{12}NO_2^{\ominus}H(CHOH)_5CH_2(CH_3)$-$NH_2^{\oplus}$. |

As noted above, the compounds of this invention are useful in the treatment of influenze, especially the B-strains of influenza, in warm-blooded animals such as mice and ferrets, as well as primates, for example, monkeys and chimpanzees. These new agents show both prophylactic and therapeutic activity against influenza-B viruses.

This utility of the compounds is illustrated in the following examples. In the examples:

The standard procedure for preparing test formulations of these compounds is to dissolve them in water containing a small amount of Tween® 80 (1 drop/20 ml., Tween® is a polyethylene oxide sorbitan monooleate), and neutralize the resultant solution if necessary;

The influenza virus designation B/AA/3/62 refers to the type (B), source or place of epidemic (AA, for Ann Arbor), sample number successfully cultured (3), and year of epidemic (62 for 1962); and Compound 1 was neutralized by the addition of sodium hydroxide, Compound 2 gave a solution having a pH of 5.7 which is close enough to neutrality for practical use, and Compound 3 gave a substantially neutral solution that was used directly. LD₅₀ is the dose that is lethal to 50% of test animals and ED₅₀ is the dose effective for 50% of the test animals.

EXAMPLE A

Therapy of Influenza B

Groups of mice were injected (intranasally) with 20 LD₅₀ doses of Influenza B/AA/3/62 virus. Beginning eight hours after infection and continuing through 56 hours after infection, separate groups of mice were treated with the following dosages of Compound 1 or Compound 2. Compound 1 was the 1,1,2,2,3,3,7,7,8,8,9,9-dodecafluoro - 10 - aza-5-oxa-dispiro[3.1.3.2]undecan-11-one of Example 1; Compound 2, the 1,1,2,2,3,3,7,7,8,8,9,9-dodecafluoro - 10-methyl - 10-aza-5-oxadispiro[3.1.3.2]undecan-11-one of Example 2; and Compound 3, the piperidine salt of Example 3.

Compound 1: 5, 2.5, 1.25, 0.625 and 0 mg./kg.
Compound 2: 10, 5, 2.5, 1.25 and 0 mg./kg.

The drug was administered per os by intubation. The data are collected in Table I and are shown in the drawing. N is the number of survivors on day 4, MSD is mean survivor days and is calculated by the formula:

$$MSD = \frac{\Sigma(\text{no. dead per day})(\text{day}-1)}{\text{no. animals per group}}$$

These data show the $ED_{50}$ for Compound 1 is 2.85 mg./kg. and 9.08 mg./kg. for Compound 2. The therapeutic ratios ($LD_{50}/ED_{50}$) are 4.5 for Compound 1 and 5.5 for Compound 2.

the 48- through 96-hour treatments and active at the other treatment times. Compound 2 was inactive in the 48- through 96-hour and the 24- through 72-hour treatments, weakly active in the 16- through 64-hour treatments and equally active in the 8- through 56-hour and the 0- through 48-hour treatments.

TABLE I.—EFFECTS OF COMPOUND 1 AND COMPOUND 2 ON INFLUENZA B/AA/3/63 INFECTIONS IN MICE WHEN GIVEN ORALLY BY INTUBATION AT 4-HOUR INTERVALS BEGINNING 8 HOURS AFTER AND ENDING 56 HOURS AFTER INFECTION

| Compound | Mg. kg. | N[1] | Percent survivors day | | | | | | Mean, percent S | MSD |
|---|---|---|---|---|---|---|---|---|---|---|
| | | | 5 | 6 | 7 | 8 | 9 | 10 | | |
| 1 | 5.0 | 40 | 97.5 | 90.0 | 85.0 | 77.5 | 72.5 | 70.0 | 82.1 | 9.2 |
| | 2.5 | 40 | 95.0 | 85.0 | 67.5 | 62.5 | 55.0 | 55.0 | 70.0 | 8.2 |
| | 1.25 | 37 | 91.9 | 86.5 | 67.6 | 51.3 | 43.2 | 32.4 | 62.2 | 7.8 |
| | 0.625 | 38 | 97.3 | 92.1 | 71.0 | 47.4 | 34.2 | 23.7 | 61.0 | 7.7 |
| | 0 | 39 | 94.9 | 89.7 | 64.1 | 35.9 | 10.3 | 7.7 | 50.4 | 7.0 |
| 2 | 10.0 | 38 | 100.0 | 86.8 | 76.3 | 68.4 | 65.8 | 65.8 | 77.2 | 8.6 |
| | 5.0 | 38 | 94.7 | 92.1 | 65.8 | 47.4 | 34.2 | 28.9 | 60.5 | 7.6 |
| | 2.5 | 39 | 89.7 | 64.1 | 46.1 | 30.8 | 23.1 | 15.4 | 44.9 | 6.7 |
| | 1.25 | 39 | 84.6 | 71.8 | 43.6 | 30.8 | 20.5 | 10.3 | 43.6 | 6.6 |
| | 0 | 40 | 95.0 | 80.0 | 52.5 | 27.5 | 15.0 | 7.5 | 46.2 | 6.8 |

[1] N = the number of mice surviving on the 4th day after infection.

EXAMPLE B

Prophylactic activity of Compound 2 against Influenza B

Decreasing concentrations of Compound 2 in the drinking water were provided to mice from 24 hours prior to infection with influenza B/AA/3/62 to 48 hours after infection. The mice were observed for 10 days and the percent survivors and mean survival day were calculated. Results of this test are shown in Table II and indicate a high degree of protection by this compound.

TABLE II.—ANTI-INFLUENZA B/AA/3/62 ACTIVITY OF COMPOUND 2[1] (−24 TO +48 HOURS)

| Mg./kg. | | S/N[2] 10 days | Percent S | MSD |
|---|---|---|---|---|
| 72 hours | First 24 hours | | | |
| 300 | 235 | 11/12 | 92 | 9.2 |
| 225 | 106 | 6/12 | 50 | 8.7 |
| 79 | | 3/12 | 25 | 8.2 |
| 22 | | 1/12 | 8 | 5.3 |
| 0 | | 4/36 | 11 | 6.4 |

$ED_{50}$ = 190 mg. kg. 72 hours.
[1] Compound in drinking water.
[2] S N = survivors per number of animals per group.

EXAMPLE C

Effect of delay treatment of Influenza B infections of mice with Compound 1 and Compound 2

Since mice stop or greatly cut down on water intake after infection with influenza viruses, the effect of treatment started after infection with compound in the drinking water could not be studied. Therefore, compounds were administered to the mice every 4 hours by oral intubation starting at various times after infection with influenza B/AA/3/62.

The compounds were administered per os at 5 mg./kg. for Compound 1 and 10 mg./kg. for Compound 2 at 4-hour intervals from 0 through 48 hours, 8 through 56 hours, 16 through 64 hours, 24 through 72 hours and 48 through 96 hours. Control animals were given water at the same time.

The data are shown in Table III for Compound 1 and Table IV for Compound 2. Compound 1 was inactive in

TABLE III.—EFFECT OF COMPOUND 1[1] ON INFLUENZA B/AA/3/62[2] INFECTIONS OF MICE

[Number of survivors out of 20 mice]

| Treatment period[3] | Test group | Days postinfection | | | | | | |
|---|---|---|---|---|---|---|---|---|
| | | 4 | 5 | 6 | 7 | 8 | 9 | 10 |
| 0–48 | Treated | 19 | 18 | 16 | 15 | 13 | 13 | 13 |
| | Control | 20 | 17 | 14 | 11 | 7 | 4 | 2 |
| 8–56 | Treated | 20 | 18 | 17 | 17 | 16 | 16 | 15 |
| | Control | 19 | 18 | 14 | 12 | 8 | 4 | 2 |
| 16–64 | Treated | 20 | 20 | 17 | 15 | 14 | 14 | 13 |
| | Control | 20 | 17 | 13 | 8 | 8 | 4 | 3 |
| 24–72 | Treated | 20 | 20 | 19 | 16 | 14 | 13 | 13 |
| | Control | 19 | 17 | 14 | 8 | 4 | 2 | 1 |
| 48–96 | Treated | 20 | 20 | 15 | 7 | 6 | 5 | 5 |
| | Control | 20 | 18 | 15 | 9 | 3 | 2 | 1 |

[1] Treatment every 4 hours at 5 mg./kg. orally (13 doses) for period indicated after infection.
[2] 10 $LD_{50}$ of virus.
[3] Period of treatment after infection at 0 hours.

TABLE IV.—EFFECT OF COMPOUND 2[1] IN INFLUENZA B/AA/3/62[2] INFECTIONS OF MICE

[Number of survivors out of 20 mice]

| Treatment period[3] | Test group | Days postinfection | | | | | | |
|---|---|---|---|---|---|---|---|---|
| | | 4 | 5 | 6 | 7 | 8 | 9 | 10 |
| 0–48 | Treated | 20 | 20 | 20 | 17 | 13 | 11 | 10 |
| | Control | 19 | 15 | 10 | 7 | 5 | 3 | 1 |
| 8–56 | Treated | 20 | 19 | 19 | 18 | 17 | 12 | 10 |
| | Control | 19 | 18 | 12 | 8 | 6 | 3 | 3 |
| 16–64 | Treated | 19 | 18 | 15 | 15 | 9 | 7 | 7 |
| | Control | 19 | 17 | 13 | 6 | 2 | 1 | 1 |
| 24–72 | Treated | 20 | 19 | 15 | 14 | 8 | 7 | 7 |
| | Control | 20 | 19 | 15 | 8 | 5 | 4 | 0 |
| 48–96 | Treated | 20 | 20 | 13 | 9 | 8 | 4 | 3 |
| | Control | 20 | 19 | 13 | 11 | 8 | 3 | 2 |

[1] Treatment every 4 hours at 10 mg./kg. orally (13 doses) for period indicated after infection.
[2] 10 $LD_{50}$ of virus.
[3] Period of treatment after infection at 0 hours.

EXAMPLE D

Prophylactic activity of Compound 1 and Compound 3 against Influenza B

Compound 1 and Compound 3 were provided in the drinking water (0.5 mg./ml.) to mice from 24 hours prior to infection with Influenza B/AA/3/62 to 48 hours after infection. Compound 1 was added to the water as an aqueous solution neutralized to $pH_7$ by sodium hydroxide. Compound 3, the piperidine salt of Compound 1, was dissolved directly and used in the water as such. The mice were observed for 10 days and the percentage of survivors calculated. Results of the test indicate a high degree of protection for Compound 1 and its piperidine salt (Compound 3).

The compounds of this invention can actually be administered to warm-blooded animals for antiviral effect by any suitable means. For example, administration can be parenterally, orally, or by suppository for mucosal absorption.

The dosage administered will be dependent upon age, health and weight of the recipient, the kind of concurrent treatment if any, frequency of treatment, and the nature of the effect desired. Generally, a daily dosage of active ingredient compound will be from about 0.01 to 100 mg. per kg. of body weight. Ordinarily, from 0.1 to 10 mg./kg. and preferably 0.5 to 5 mg./kg. per day, in one or more applications per day, is effective to obtain the desired result.

The active ingredient can be employed in useful compositions also within the present invention in such dosage forms as tablets, capsules, powder packets, or liquid solutions, suspensions, or elixirs, for oral administration or liquid solutions for parenteral use. In such compositions, the active ingredient will ordinarily always be present in an amount of at least 0.02% by weight based on the total weight of the composition and not more than 99% by weight.

Besides the active ingredient, the composition will contain a solid or liquid nontoxic pharmaceutical carrier for the active ingredient.

In one embodiment of a pharmaceutical composition, the solid carrier is a capsule which can be of the ordinary gelatin type. In the capsule will be from about 1–50% by weight of a compound of Formula I and 99–50% of an excipient or mixture of excipients such as starch, lactose, mannitol, calcium sulfate, microcrystalline cellulose, talc, magnesium stearate and finely divided silicon dioxide. In another embodiment the active ingredient is tableted. In yet another embodiment, the active ingredient is put into powder packets and employed. These capsules, tablets and powders will generally constitute from about 1% to about 95% and preferably from 1% to 50% by weight of active ingredient. These dosage forms preferably contain from about 1 to about 500 mg. of active ingredient, with from about 10 to about 100 most preferred.

The pharmaceutical carrier can, as previously indicated, be a liquid such as water and oils, including those of petroleum, animal, vegetable or synthetic origin, for example, peanut oil, soybean oil, mineral oil, sesame oil, and the like. In general, water, saline, aqueous dextrose (glucose) and related sugar solutions and glycols such as propylene glycol, polyethylene glycols, or sorbitol are preferred liquid carriers.

As mentioned above, oral administration can be in a suitable suspension or syrup, in which the active ingredient ordinarily will constitute from about 0.02 to 10%, and preferably about 0.1 to 5% by weight. The pharmaceutical carrier in such composition can be a watery vehicle usch as an aromatic water, a syrup or a pharmaceutical mucilage.

Suitable pharmaceutical carriers are described in "Remington's Pharmaceutical Sciences," 13th ed., edited by E. W. Martin, Mack Publish Co., Easton, Pa. (1965), a well-known reference text in this field.

In addition to the exemplary illustrations above, the following examples further explain one aspect of the present invention:

EXAMPLE E

A large number of unit capsules are prepared for oral administration by filling standard two-piece hard gelatin capsules weighing about 80 mg. each with 50 mg. of powdered 1,1,2,2,3,3,7,7,8,8,9,9 - dodecafluoro-10-aza-5-oxadispiro[3.1.3.2]undecan-11-one, and 400 mg. of a mixture consisting of 90 parts of anhydrous lactose, 8 parts of talc and 2 parts of magnesium stearate.

EXAMPLE F

A large number of unit capsules are prepared for oral administration by filling soft gelatin capsules with a suspension of the compound of Example E in soybean oil.

EXAMPLE G

A dosage unit consisting of 50 mg. of active ingredient, 8 mg. of gelatin, 6 mg. of magnesium stearate, 150 mg. of mannitol and 20 mg. of corn starch, mixed and formed into a tablet by conventional tableting procedures can be prepared. Slow release tablets can also be used by applying appropriate coatings.

EXAMPLE H

A flavored syrup containing 50 mg. in 5 ml. can be prepared by dissolving the sodium salt of 1,1,2,2,3,3,-7,7,8,8,9,9 - dodecafluoro - 10 - aza - 5 - oxadispiro-[3.1.3.2]undecan-11-one in a flavored solution of sorbitol so that the final concentration is 1% weight/volume.

A large variety of compositions can thus readily be made by substituting other compounds of this invention, and including specifically but not limited to compounds that have been named hereinbefore. The compounds will be used in the amounts indicated in accordance with procedures well known and described in the Martin text mentioned above.

The disclosure herein should not be taken as a recommendation to use the disclosed invention in any way without full compliance with Food and Drug Laws and other laws and governmental regulations which may be applicable.

The embodiments of the invention in which an exclusive property or privilege is claimed are described as follows:

1. A compound of the formula

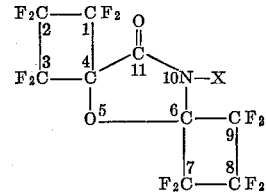

wherein X is selected from the group consisting of hydrogen, methyl, ammonium; substituted ammonium containing up to 3 alkyl groups of 1–5 carbon atoms, or one pentamethylene group, the total number of carbon atoms being no more than 12; and one equivalent of a metal of atomic number 20 or less exclusive of beryllium.

2. The compound of claim 1 in which X is hydrogen, 1,1,2,2,3,3,7,7,8,8,9,9 - dodecafluoro - 10 - aza - 5 - oxadispiro[3.1.3.2]undecan-11-one.

3. A salt of a compound of claim 2 in which the cation is that of a metal of atomic number 20 or less exclusive of beryllium.

4. The compound of claim 1 in which X is methyl, 1,1,2,2,3,3,7,7,8,8,9,9 - dodecafluoro - 10 - methyl - 10 - aza-5-oxadispiro[3.1.3.2]undecan-11-one.

5. The compound of claim 1 in which X is piperidinium, the piperidine salt of 1,1,2,2,3,3,7,7,8,8,9,9 - dodecafluoro-10-aza-5-oxadispiro[3.1.3.2]undecan-11-one.

References Cited

UNITED STATES PATENTS 3,310,570   3/1967   Middleton _____ 260—299

HENRY R. JILES, Primary Examiner

G. T. TODD, Assistant Examiner

U.S. Cl. X.R.

260—299, 307; 424—272